United States Patent
Loch

(10) Patent No.: US 11,275,840 B2
(45) Date of Patent: Mar. 15, 2022

(54) MANAGEMENT OF TAINT INFORMATION ATTACHED TO STRINGS

(71) Applicant: SAP SE, Walldorf (DE)

(72) Inventor: Florian Loch, Karslruhe (DE)

(73) Assignee: SAP SE, Walldorf (DE)

( * ) Notice: Subject to any disclaimer, the term of this patent is extended or adjusted under 35 U.S.C. 154(b) by 170 days.

(21) Appl. No.: 16/524,891

(22) Filed: Jul. 29, 2019

(65) Prior Publication Data

US 2021/0034751 A1 Feb. 4, 2021

(51) Int. Cl.
| H04L 29/06 | (2006.01) |
| G06F 21/52 | (2013.01) |
| G06F 21/56 | (2013.01) |
| G06F 21/57 | (2013.01) |
| G06F 21/60 | (2013.01) |

(52) U.S. Cl.
CPC .......... *G06F 21/577* (2013.01); *G06F 21/563* (2013.01); *G06F 21/566* (2013.01); *G06F 21/56* (2013.01); *G06F 21/60* (2013.01)

(58) Field of Classification Search
CPC ...... G06F 21/56; G06F 21/577; G06F 21/563; G06F 21/566; G06F 21/57; G06F 21/52; G06F 21/60; H04L 29/06
See application file for complete search history.

(56) References Cited

U.S. PATENT DOCUMENTS

| 7,870,610 B1 * | 1/2011 | Mitchell | ................. G06F 21/53 726/23 |
| 8,127,360 B1 * | 2/2012 | Wilhelm | ............... G06F 21/552 726/25 |
| 8,413,240 B2 | 4/2013 | Katsunuma et al. | |
| 8,584,232 B2 | 11/2013 | Kerschbaum | |
| 8,621,607 B2 | 12/2013 | Pike | |
| 9,063,766 B2 | 6/2015 | Chow et al. | |
| 9,171,028 B1 | 10/2015 | Collingbourne et al. | |

(Continued)

FOREIGN PATENT DOCUMENTS

| CN | 103745755 A | 4/2014 |
| WO | WO-2019/070675 A1 | 4/2019 |

OTHER PUBLICATIONS

Extended European Search Report, dated Dec. 8, 2020, for European Patent App. No. 20187560.6, 6 pages.

(Continued)

*Primary Examiner* — Jayesh M Jhaveri
(74) *Attorney, Agent, or Firm* — Sterne, Kessler, Goldstein & Fox P.L.L.C.

(57) ABSTRACT

Disclosed herein are system, method, and computer program product embodiments for propagating taint information for strings using metadata. Taint information for a string is encoded using taint ranges. When an operation is performed on the string, the operation and any additional taint information corresponding to the operation is encoded into a delta layer of the metadata. Rather than immediately obtaining taint information for a result string when the operation is performed on the string, the delta layer stores the taint information for the operation, and any subsequent operation, until it is needed. Once the taint information is needed, then the delta layers are collapsed into base layer taint information in order to resolve taint information for a result string.

20 Claims, 8 Drawing Sheets

(56) References Cited

U.S. PATENT DOCUMENTS

| | | | |
|---|---|---|---|
| 9,460,290 B2 | 10/2016 | Glew et al. | |
| 10,129,285 B2 | 11/2018 | Johns et al. | |
| 2011/0145918 A1* | 6/2011 | Jung | G06F 3/0622 726/22 |
| 2011/0252475 A1* | 10/2011 | Mui | G06F 21/56 726/23 |
| 2011/0314337 A1 | 12/2011 | Sinha et al. | |
| 2016/0006758 A1* | 1/2016 | Holt | G06F 21/50 726/23 |
| 2017/0318045 A1 | 11/2017 | Johns et al. | |
| 2018/0365414 A1* | 12/2018 | Guarnieri | G06F 21/577 |
| 2019/0073473 A1* | 3/2019 | VanderLeest | G06F 21/6218 |
| 2019/0108332 A1* | 4/2019 | Glew | G06F 21/552 |
| 2019/0205532 A1 | 7/2019 | Loch et al. | |
| 2020/0293682 A1* | 9/2020 | Zonouz | G06F 21/552 |

OTHER PUBLICATIONS

Bell, J. et al., "Dynamic Taint Tracking for Java with Phosphor (Demo)," ISSTA'15, 5 pages, Jul. 12-17, 2015.

Chin, E. et al., "Efficient Character-level Taint Tracking for Java," SWS'09, 9 pages, Nov. 13, 2009.

Clause, J. et al., "Dytan: A Generic Dynamic Taint Analysis Framework," ISSTA'07, 11 pages, Jul. 9-12, 2007.

Haldar, V. et al., "Dynamic Taint Propagation for Java," Proceedings of the 21st Annual Computer Security Applications Conference, pp. 303-311, Dec. 5-9, 2005.

Halfond, W.G.J. et al., "AMNESIA: Analysis and Monitoring for Neutralizing SQL-Injection Attacks," ASE'05, 10 pages, Nov. 7-11, 2005.

Hayes, A.B. et al., "GPU Taint Tracking," 2017 USENIX Annual Technical Conference (USENIX ATC '17), pp. 209-220, Jul. 12-14, 2017.

Lekies, S. et al., "25 Million Flows Later—Large-scale Detection of DOM-based XSS," CCS'13, 12 pages, Nov. 4-8, 2013.

Loch, F.D., "Juturna: Lightweight, Pluggable and Selective Taint Tracking for Java," Karlsruher Institut für Technologie, Master-Thesis, 140 pages, Feb. 2018.

"OWASP Top 10 2017: The Ten Most Critical Web Application Security Risks, Release Candidate 2," The OWASP Foundation, https://owasp.org, 26 pages, 2003.

Parameshwaran, I. et al., "Auto-patching DOM-Based XSS at Scale," ESEC/FSE'15, 12 pages, Aug. 31-Sep. 4, 2015.

Pfistner, S., "End-to-end taint tracking in the web," Technische Universität Darmstadt, Master-Thesis, 52 pages, Oct. 24, 2016.

Venkataramani, G. et al., "FlexiTaint: A Programmable Accelerator for Dynamic Taint Propagation," 14th IEEE International Symposium on High-Performance Computer Architecture (HPCA), 12 pages, Feb. 2008.

Wei, Z. et al., "LazyTainter: Memory-Efficient Taint Tracking in Managed Runtimes," SPSM'14, 12 pages, Nov. 7, 2014.

* cited by examiner

MANAGEMENT OF TAINT INFORMATION ATTACHED TO STRINGS

BACKGROUND

When data is received by a program from an external source, the integrity of the data cannot necessarily be trusted. This is particularly the case for web-based interfaces that take data from an untrusted client and use it in a backend program. Such data may be manipulated to perform cross-site scripting (XSS) or SQL injections that can adversely impact the operation of the backend program itself, or data sources or systems accessible to the backend program.

Accordingly, approaches are needed to sanitize data received from untrusted sources to prevent attacks.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for managing taint information attached to strings.

Taint tracking is an effective countermeasure against various injection attacks, like cross-site scripting (XSS) or structured query language (SQL) injection. These attacks rely on injecting malicious information, such as malicious code, into an otherwise clean string.

Common approaches to dealing with injection attacks include sanitizing and filtering inputs. However, these approaches are often fixed at development-time, and cannot necessarily address unexpected attacks dynamically at runtime.

One approach for future-proofing against injection attacks is to track tainted user input. If this user input is included in a string that is consumed by a "sink" (any piece of code that uses that string as an input), the situation may be cause for concern. Specifically, any time a sink consumes a potentially tainted string, that string constitutes an attack vector. Any sanitization of the string (and corresponding marking of that string as untainted), should occur before consumption by the sink.

When a tainted string reaches the sink, a number of approaches can be taken to mitigate any possible harm, such as raising an exception, ignoring the string input, and/or logging information about the tainted string. Persons skilled in the relevant arts will appreciate that any approach dealing with taint data for a string is contemplated within the scope of this disclosure.

Providing taint data to allow for tracking of a tainted string is a cumbersome process. In some approaches, a single flag is used for an entire string to indicate whether the string is tainted by user input data or not. If untrusted user input is included in a string, the entire string is flagged as tainted. In this approach, taint information for each string can be managed by a single Boolean flag, but at a loss of granularity. Even if the tainted portion of the string is ultimately not used by the sink, the entire string must be treated as tainted (and therefore a potential attack vector).

In another approach, a taint flag is used for each character in a string. In this scenario, a string is understood as a character array. One skilled in the relevant arts will appreciate that other data arrays could be flagged for taint information in a similar manner to the character arrays discussed herein, but strings made up of character arrays are used by way of non-limiting example.

Figure 1A:
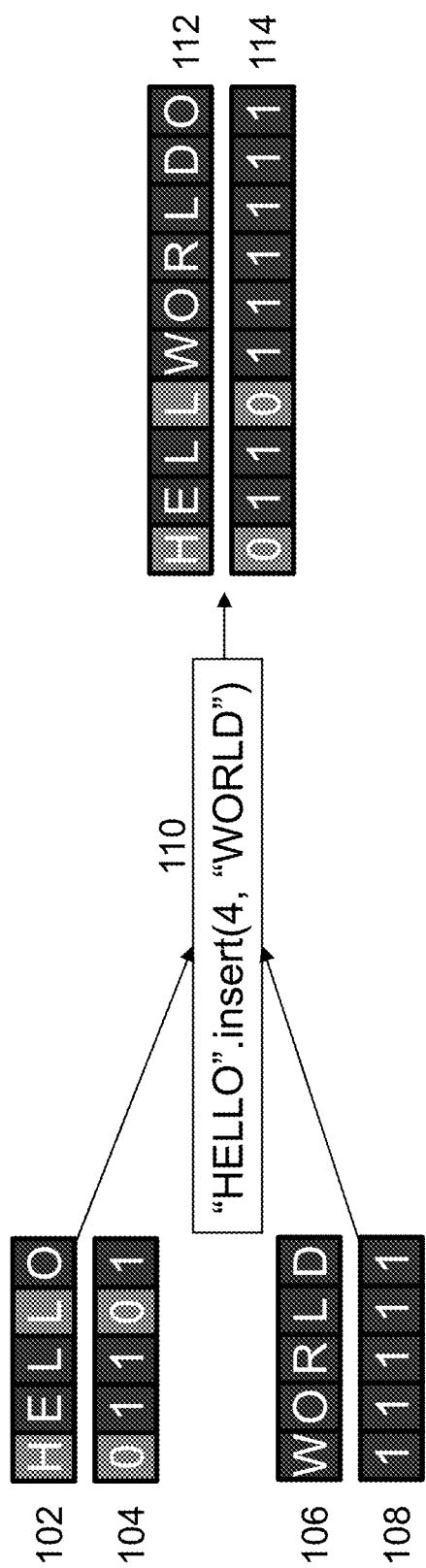
FIGS. 1A and 1B illustrate operations on character arrays having character-level taint flags, in accordance with an embodiment.
Figure 1B:
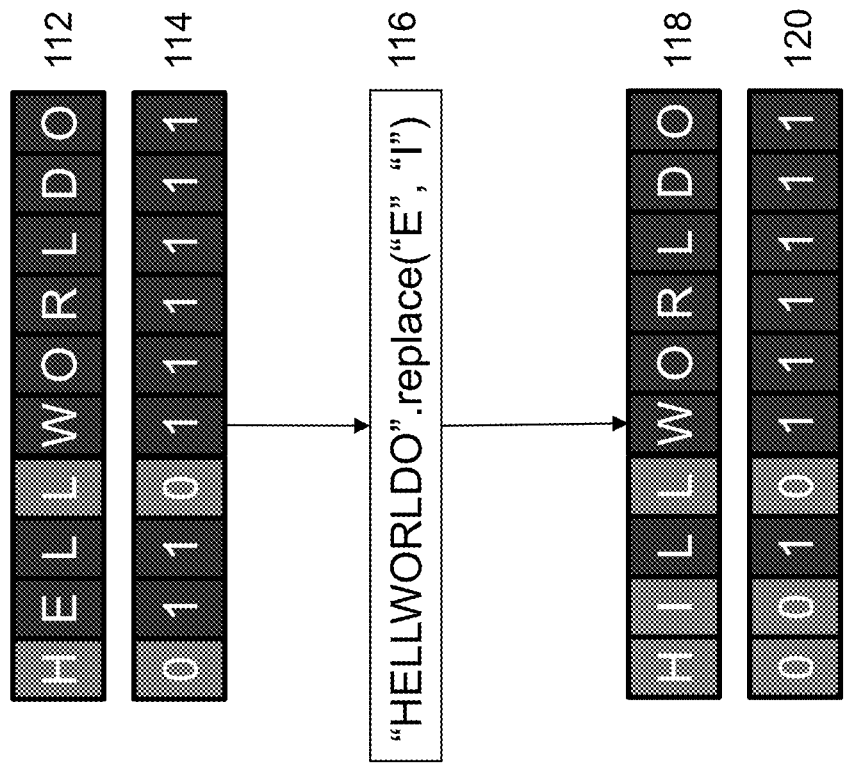

FIGS. 1A and 1B illustrate operations on character arrays having character-level taint flags, in accordance with an embodiment. As shown in FIG. 1A, the string "HELLO" 102 has tainted characters at positions 1, 2, and 4, shown by a taint array 104 {0, 1, 1, 0, 1}. Similarly, the string "WORLD" 106 is entirely tainted, as shown by a taint array 108 {1, 1, 1, 1, 1}. In these examples, a '1' indicates that the corresponding character is tainted, while a '0' indicates that the corresponding character is not tainted.

A number of operations can be performed on strings. When these operations are performed on a string, the taint information must be computed and follow the resulting string. For example, as shown in FIG. 1A, the operation 110 "HELLO".insert(4, "WORLD") inserts string "WORLD" 106 into the fourth position (assuming a 0-numbered character array) of the string "HELLO" 102, resulting in string 112 "HELLWORLDO".

Using the taint arrays 104 and 108, it is possible to determine a taint array for the resulting string 112. The new taint array 114 is {0, 1, 1, 0, 1, 1, 1, 1, 1, 1}, and is determined by performing a similar insertion operation on the taint arrays to place taint array 108 into taint array 104.

FIG. 1B shows an additional operation performed on string 112-operation 116 "HELLWORLDO".replace("E", "I"). This operation results in string 118 "HILLWORLDO" with taint array 120 {0, 0, 1, 0, 1, 1, 1, 1, 1, 1}. By way of non-limiting example, replacing a tainted character (the "E" at string 112 position [1]) with a trusted character, that character is marked as untainted. One skilled in the art will recognize that different operations may be treated as tainting or untainting a character, or even as propagating a prior taint flag for that character, and that this specific replace operation is provided by way of example and not limitation.

While using taint arrays like taint arrays 104, 108, 114, and 120 allows easy character-by-character identification of taint and quick lookup of the same, maintaining these taint arrays requires large amounts of memory for both storage and computation.

Figure 4A:
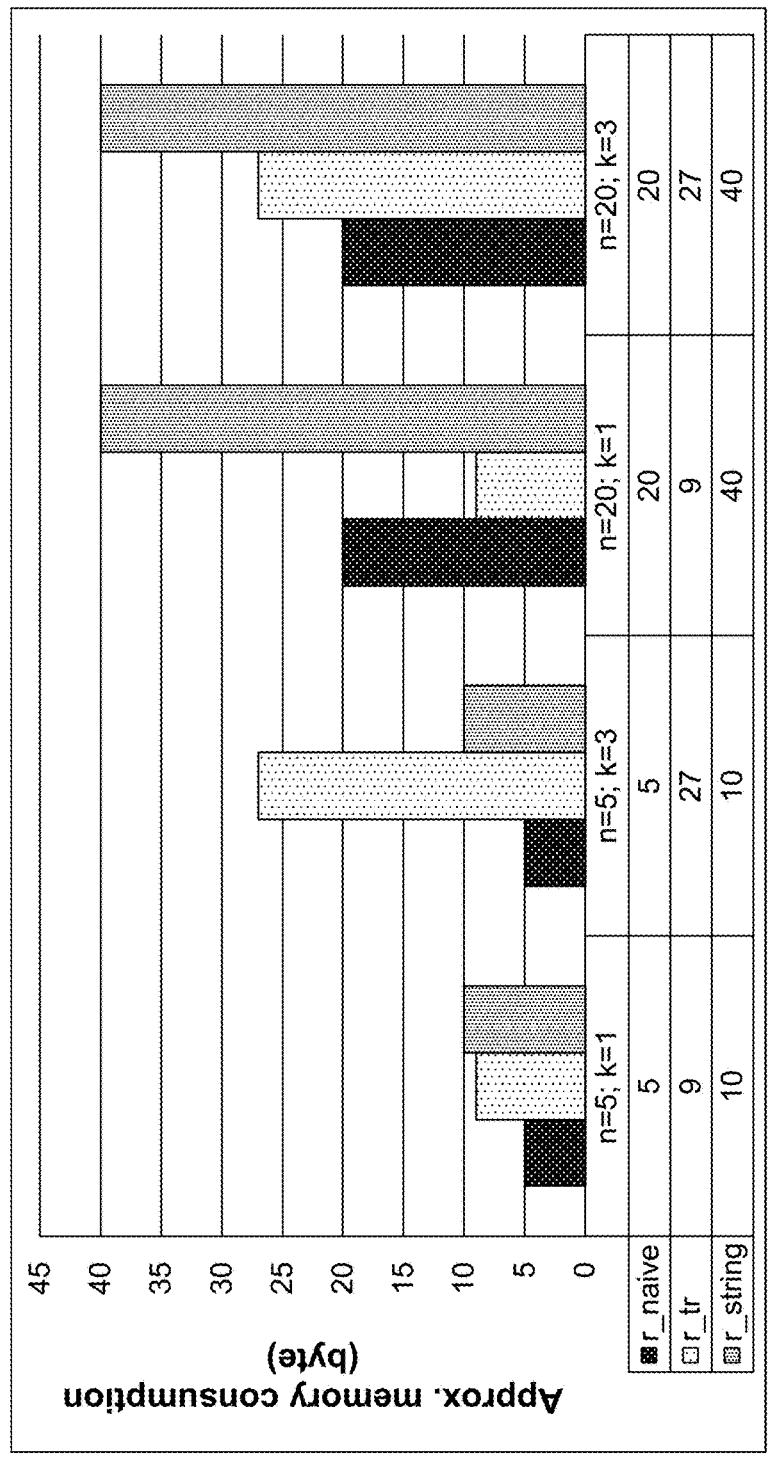
FIGS. 4A and 4B illustrate graphs showing memory consumption costs for maintaining taint information, in accordance with an embodiment.
Figure 4B:
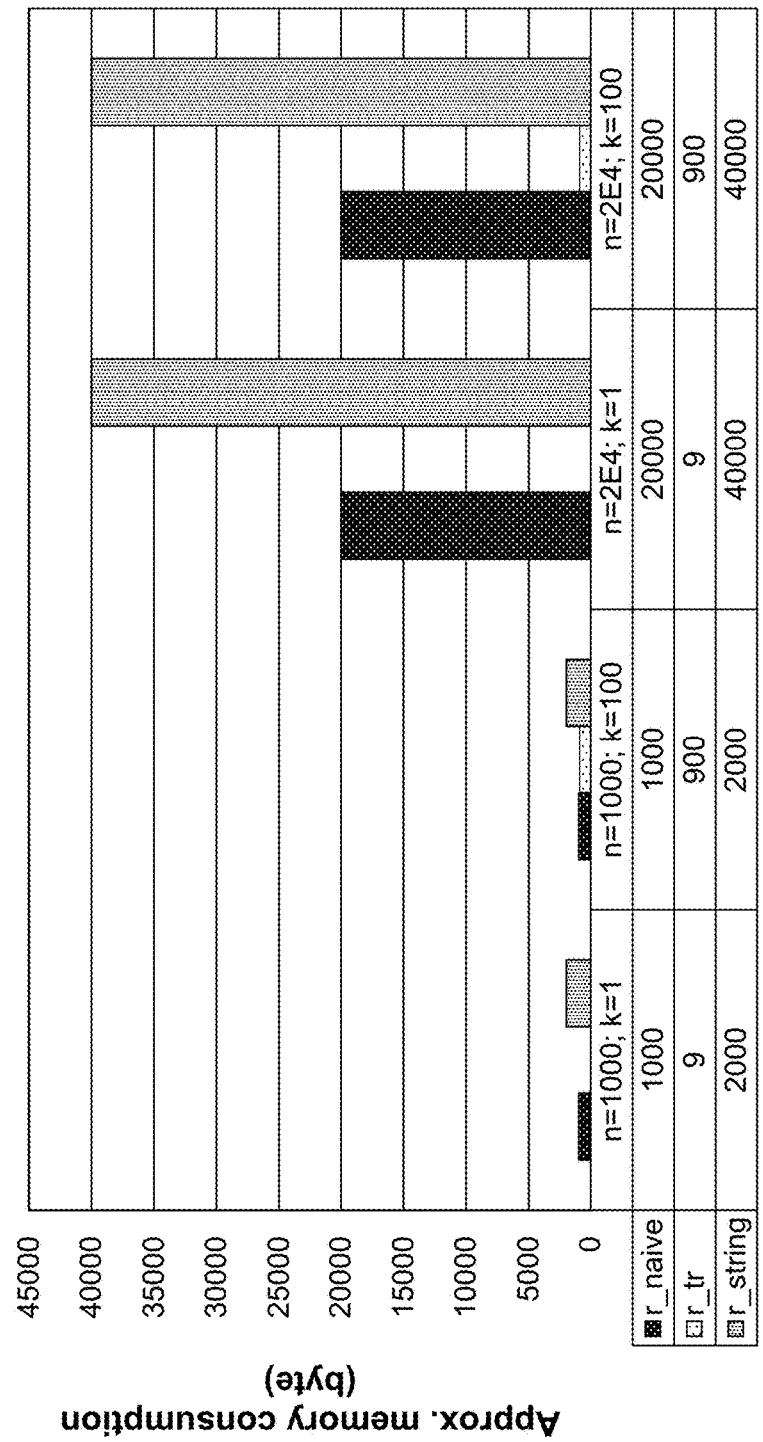

FIGS. 4A and 4B illustrate graphs 400A and 400B showing memory consumption costs for maintaining taint information, in accordance with an embodiment. Graphs 400A and 400B show various memory consumption scenarios, in accordance with an embodiment. The 'n' value shown for each set of bar graphs is the length of a string (e.g., n=5 for the string "HELLO"). By way of non-limiting example, Java Virtual Machine implementations of a string use two bytes of data per character, and therefore the memory consumption in bytes for the string (given by r_string for each set of bar graphs) is twice the size of the string in characters (e.g., r_string=10 bytes if n=5; r_string=2000 bytes if n=1000; etc.).

The character-level taint arrays will be sized proportionately to each corresponding string. If each taint array element consumes a byte (by way of non-limiting example, Java Virtual Machine implementations map Boolean values to byte data types), the string "HELLO" requires an additional five bytes of data just to store the taint data. This result is shown as the r_naive cost in each set of bar graphs (e.g., r_naive=5 bytes if n=5; r_naive=1000 bytes if n=1000; etc.)

As shown in the later bar graphs of chart 400B, the costs of r_naive scale proportionately to the size of the strings being tracked for taint data. If n=20000, then r_naive=20000 bytes. Passing larger taint data sets and using them in operations therefore becomes increasingly expensive as more strings are tracked in a program. In this particular scenario, the cost is a 50% overhead beyond the string itself.

An alternative approach to one-to-one taint elements mapped to strings is the use of taint ranges. Taint ranges preserve the granularity of character-level taint protection, but reduce memory usage.

For example, in the example above the string "HELLO" 102 has tainted characters at positions 1, 2, and 4, shown by a taint array 104 {0, 1, 1, 0, 1}. This same taint information can be conveyed by a set of taint ranges: [1,3] and [4,5], indicating that the tainted characters are those at positions 1, 2, and 4. Similarly, in the above example "WORLD" 106 is entirely tainted, as shown by a taint array 108 {1, 1, 1, 1, 1}. This same taint information can be conveyed by a single taint range: [0,5].

Taint ranges are stored as metadata with a string. The memory cost of using a taint range scales with the number of ranges needed. Returning to graphs 400A and 400B, the value 'k' denotes the number of taint ranges needed to convey the full taint information equivalent to the r_naive approach, which will vary depending on how many gaps (i.e., non-tainted characters) interrupt a contiguous range of tainted characters. In the above example, the string "HELLO" required two taint ranges to convey the taint information, while the fully-tainted string "WORLD" only required one taint range.

Graphs 400A and 400B assume that each taint range has a memory cost of 9 bytes, although one skilled in the relevant arts will appreciate that this amount will vary depending on what information is included with a taint range. The result, however, is that the memory cost of maintaining taint ranges (shown as r_tr in graphs 400A and 400B) is less than the memory cost of the r_naive implementation for larger string sizes (i.e., larger values of 'n'). In the far right set of columns in graph 400B, for example, the string size n=20000 with the number of taint ranges at k=100, the overhead for the r_naive implementation is significantly higher than the r_tr implementation: 20000 bytes versus 900 bytes.

As a result, using taint ranges is desirable, especially for larger string sizes. Additionally, other information may be stored with taint ranges that can be useful for aiding processing of the tainted characters. For example, a source for a given taint range may be specified and stored together with the taint range. This source information can be used to determine, for example, how to address potential taint of that taint range (e.g., what filters to apply, how dangerous the data may be, etc.).

While taint ranges can significantly reduce the overhead of taint information compared to the use of character-level taint arrays, the use of taint ranges introduces costs in maintenance of the taint ranges. This is because string operations (such as the "HELLO".insert(4, "WORLD") insert operation discussed previously) require special handling of the ranges in order to provide a result range for the resulting string. Continuing this example, the resulting "HELLWORLDO" string would have taint ranges [1,3] and [4,10].

However, there is no simple operation to combine the taint ranges [1,3] and [4,5] from the first string with the [0,5] taint range of the second string to produce the taint ranges [1,3] and [4,10] of the resulting string. Performing these operations therefore requires special string operations that also maintain the taint ranges. Despite the memory savings of taint ranges, a cost is present in finding resulting taint ranges when string operations are performed.

Figure 2A:
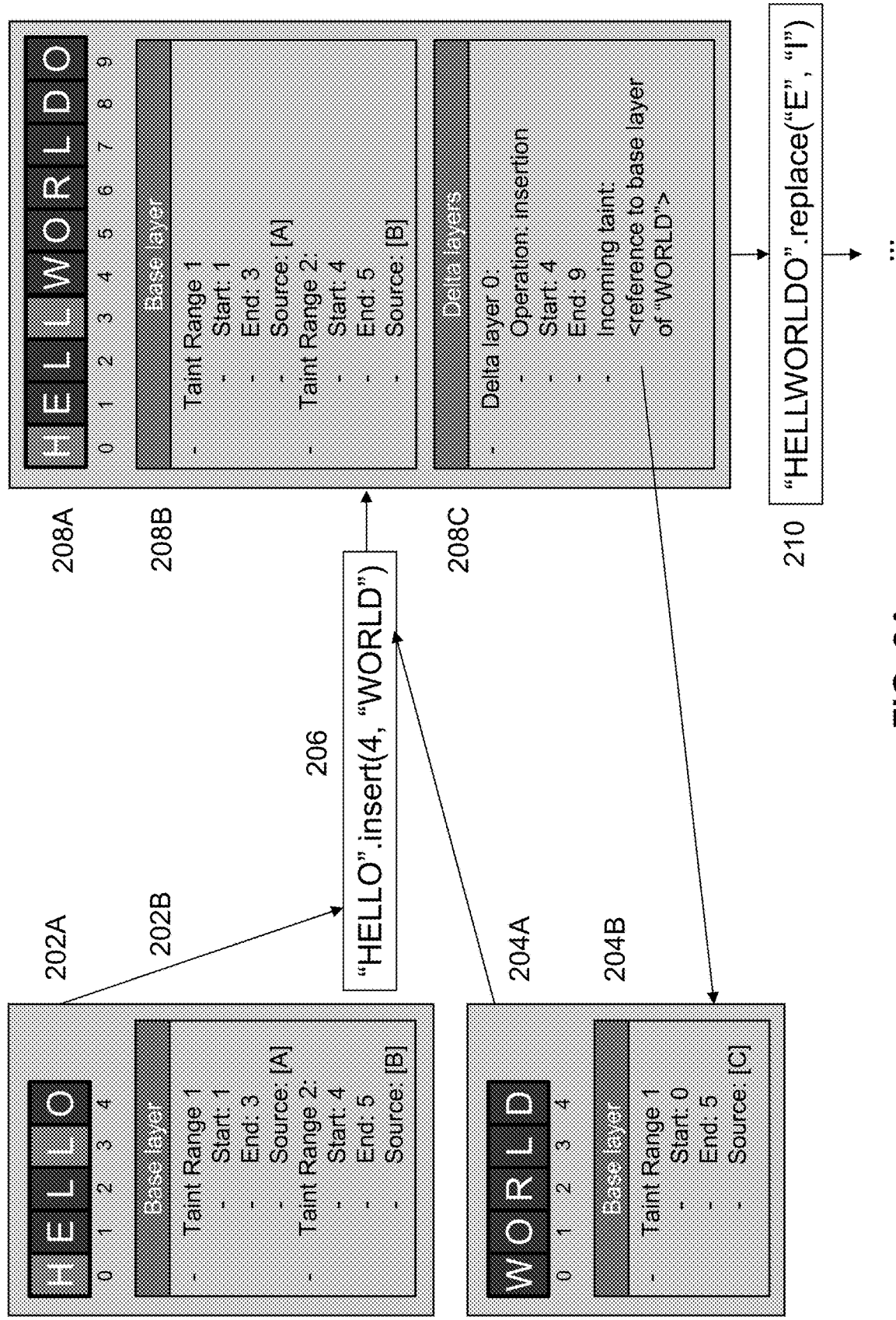
FIGS. 2A and 2B illustrate string metadata having taint range base layers and delta layers, in accordance with an embodiment.
Figure 2B:
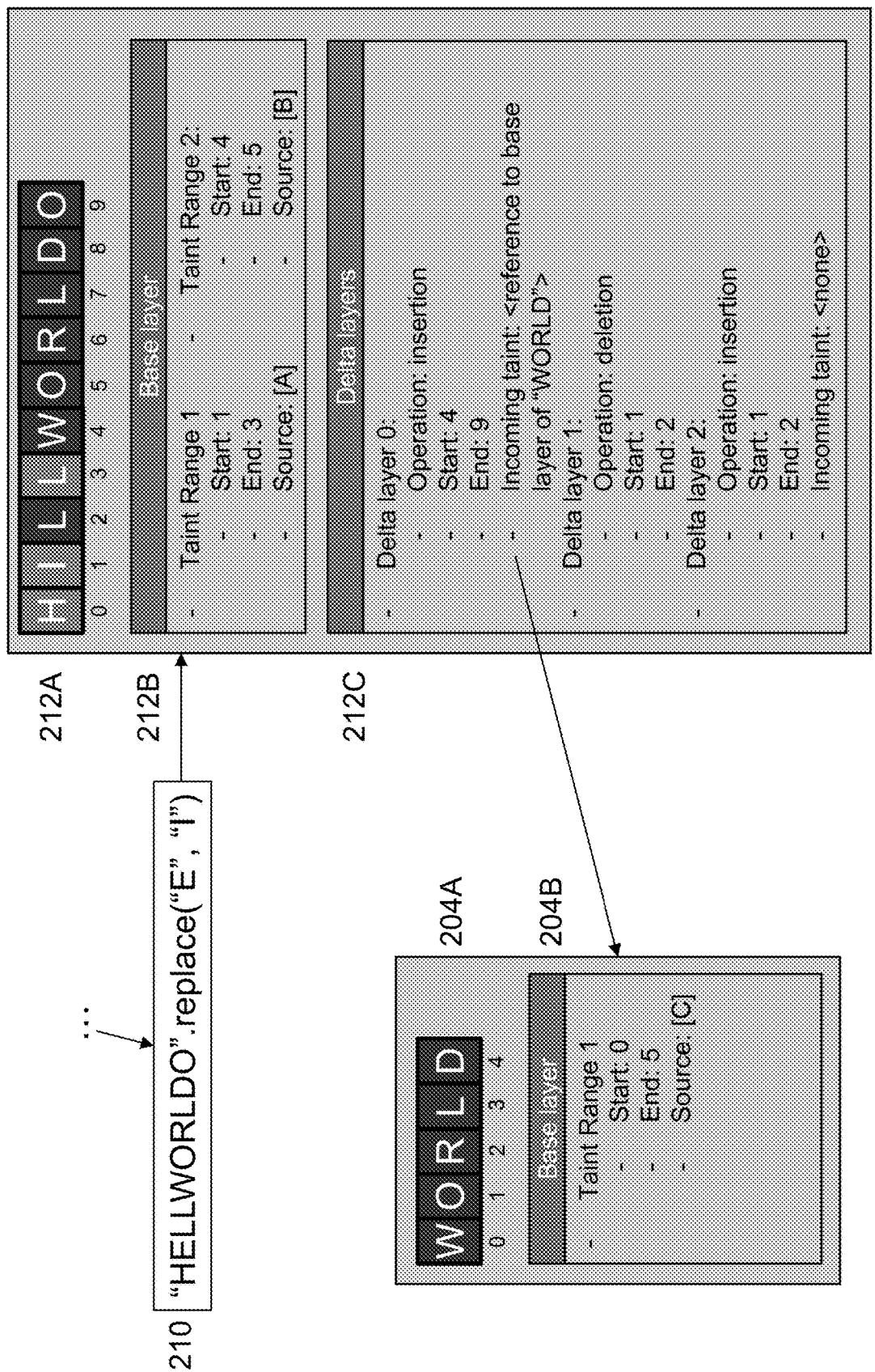

FIGS. 2A and 2B illustrate string metadata having taint range base layers and delta layers, in accordance with an embodiment. FIG. 2A illustrates "HELLO" string 202A having the same character taint profile as before—characters 1, 2, and 4 are tainted (shown by the darker background), while characters 0 and 3 are not tainted (shown by the lighter background). Similarly, "WORLD" string 204A is shown as fully tainted as before.

Each string 202A and 204A includes metadata, in accordance with an embodiment. This metadata includes base layer 202B corresponding to string 202A, and base layer 204B corresponding to string 204A. Metadata base layer 202B stores information about the two taint ranges for string 202A, shown as taint range 1 [1,3] and taint range 2 [4,5]. Additionally, in accordance with an embodiment, base layer 202B can store additional information corresponding to each taint range, such as a source (e.g., source [A] and source [B]) from which each taint range was received.

Metadata base layer 204B has a single taint range, taint range 1 [0,5], which indicates that the entire string 204A is tainted. And, similarly to base layer 202B, base layer 204B includes a source for taint range 1 [0,5] given as source [C], in accordance with an embodiment.

Again, as before, operation 206 "HELLO".insert(4, "WORLD") is performed on strings 202A and 204A, which results in string 208A "HELLWORLDO". However, rather than immediately resolving the taint range for this new result string 208A, the metadata of string 208A maintains its own base layer 208B and delta layers 208C, in accordance with an embodiment.

In accordance with an embodiment, base layer 208B mirrors the base layer of a given first string. In this case, string 202A and its corresponding base layer 202B are taken as the first string from which base layer 208B is obtained. One skilled in the relevant art will appreciate that the foregoing multi-operand "insert" instruction results in one of the two operand strings being selected as the given first string, but that the specific selection of string 202A as the first string is given by way of example, and not limitation.

Again, rather than resolving the taint information provided by base layer 204B of the second string, string 204A "WORLD", the introduced taint information is tracked in delta layers 208C. In this example, a first delta layer, delta layer 0, is created which includes information about the operation performed. In this non-limiting example, the delta layer 208C tracks that the operation was an "insertion" operation, which inserted characters starting at position 4 and ending at position 9 of the result string. Further in this non-limiting example, the taint information corresponding to string 204A (held at base layer 204B) is referenced in an incoming taint field.

The incoming taint information may be copied into the delta layer 208C rather than referenced. One skilled in the relevant arts will appreciate that any mechanism that allows tracking of the base layer information 204B within delta layer 208C will accomplish the needed operation.

The resulting taint ranges of this operation (which would be [1,3] and [4,10] if computed) can be resolved by collapsing the information in delta layers 208C into the information in base layer 208B. However, maintenance of the taint range data for result string 208A by collapsing delta layers 208C into base layer 208B can be deferred until such time as the taint ranges for string 208A are needed.

By way of non-limiting example, changes in delta layers are encoded as a quadruple containing the following information:

An operation: All modifications to character sequences can be broken down into two primitives: insertion and deletion. Other, higher order operations may be used as well, such as replace, or the operations can be described solely by way of insertions and deletions, in accordance with an embodiment.

Start of change: Describes the beginning of a region or range of a change. In accordance with an embodiment, this value is given in an absolute index to the string in order to not require reference to other layers. However, relative indices may be used instead.

End of change: Describes the end of a region or range of a change, using an absolute index. Again, one skilled in the relevant arts would appreciate that relative indices may be used instead.

Incoming taint information: In case of an insertion operation, taint information from a second string is merged into the first string.

Notably, without needing to resolve the taint information for string 208A first, another operation may be performed in accordance with an embodiment. Operation 210 "HELLWORLDO".replace("E", "I") shown at the bottom of FIG. 2A (and which carries over to FIG. 2B) can be performed on the string 208A "HELLWORLDO" with the result being string 212A "HILLWORLDO".

In this case, as previously discussed, replacement of a character is a trusted operation, and replaced characters are considered untainted. Accordingly, the character-level taint information for string 212A is {0, 0, 1, 0, 1, 1, 1, 1, 1, 1} indicating that characters 2, 4, 5, 6, 7, 8, and 9 are tainted (shown by the darker background), while characters 0, 1, and 3 are not tainted (shown by the lighter background). The resulting taint ranges, once computed, would therefore be [2,3] and [4,10].

However, once again rather than needing to resolve the taint ranges for string 212A, the base layer 212B is maintained from the earlier base layer 208B (which itself was maintained from base layer 202B), and additional delta layer information is inserted into delta layer 212C, in accordance with an embodiment.

Delta layer 212C carries over from the earlier delta layer 208C, with the exact same delta layer 0 (including reference to the incoming taint information of base layer 204B) present here. However, new delta layer information is included to address any taint introduced or removed by operation 210.

By way of non-limiting example, the replace operation of operation 210 is translated into a deletion operation (in delta layer 1) and an insertion operation (in delta layer 2). In this case, the deletion operation of delta layer 1 indicates that the character starting at position 1 and ending at position 2 (so, the single character at position 1) is deleted. A deletion operation cannot have an incoming taint, in accordance with an embodiment, so the incoming taint field is omitted. The insertion operation of delta layer 2 indicates that an insertion has been made starting at character position 1 and ending at character position 2, and that the insertion is trusted so there is no incoming taint.

One skilled in the relevant arts will appreciate that other string operations may be considered, each with their corresponding delta layer configuration. Similarly, each type of string operation may, depending on its operands, handle incoming taint information differently.

Any additional operations performed on string 212A can continue to be added as delta layers to delta layers 212C.

Figure 3:
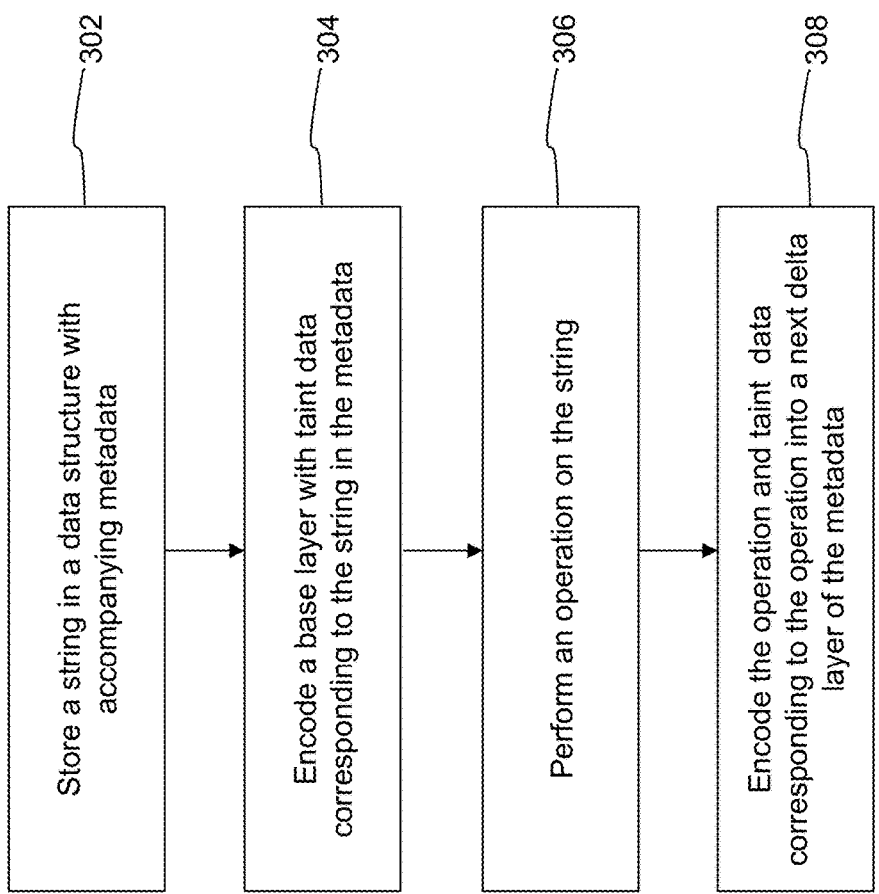
FIG. 3 is a flowchart illustrating steps by which a result string with metadata including delta layers is encoded, in accordance with an embodiment.

FIG. 3 is a flowchart 300 illustrating steps by which a result string with metadata including delta layers is encoded, in accordance with an embodiment. At step 302, a string is stored in a data structure having accompanying metadata. This could be, for example, string 202A of FIG. 2A with an accompanying metadata area. At step 304, a base layer with taint data corresponding to the string is encoded into the metadata. For example, base layer 202B of FIG. 2A is encoded into the metadata of string 202A.

At step 306, an operation is performed on the string. Returning again to FIG. 2A by way of example, operation 206 is performed on string 202A, which results in string 208A. And at step 308, the operation and taint data corresponding to the operation are encoded into a next delta layer of the metadata. In the example of FIG. 2A, the insert operation of operation 206 and the corresponding taint data are encoded into a next delta layer of delta layers 208C (in this case this is the first delta layer, delta layer 0).

Steps 306 and 308 may be repeated on the string for any additional operations, with the additional operations and taint data corresponding to the operation being encoded into subsequent delta layers (e.g., delta layers 1 and 2 of 212C in FIG. 2B).

Figure 5:
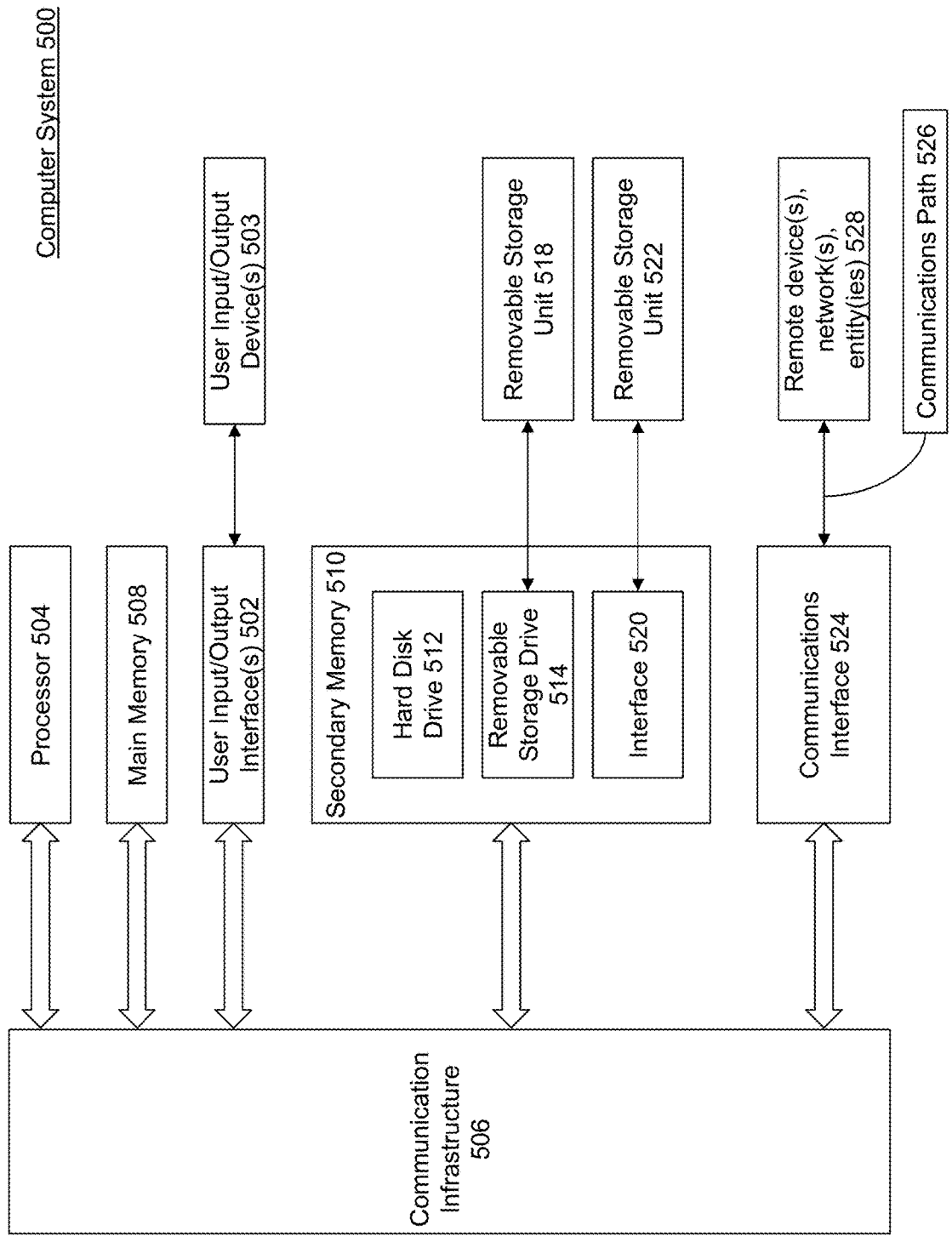
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
    storing, by one or more computing devices, a first string in a data structure, wherein the first string includes taint data, wherein the data structure includes the first string and metadata, and the metadata includes a base layer and one or more delta layers, and wherein the base layer includes at least a taint range indicating a starting position of the first string and an ending position of the first string for the taint range, and wherein the taint range represents the taint data corresponding to the first string;
    performing, by the one or more computing devices, an operation on the first string and a second string to create a result string, wherein the result string is stored in place of the first string in the data structure; and
    encoding, by the one or more computing devices, the operation and taint data corresponding to the operation into a delta layer of the one or more delta layers of the metadata of the data structure, wherein the delta layer includes taint information tracking taint data corresponding to the second string.

2. The computer implemented method of claim 1, wherein the taint data corresponding to the first string comprises tainted characters of the first string indicated by the taint range.

3. The computer implemented method of claim 1, further comprising:
    determining, by the one or more computing devices, that the result string is needed in a security sensitive operation; and
    resolving, by the one or more computing devices, responsive to the determining that the result string is needed in the security sensitive operation, the taint data corresponding to the first string and the taint data corresponding to the operation into taint data corresponding to the result string.

4. The computer implemented method of claim 3, wherein resolving the taint data corresponding to the result string is deferred until the result string is needed in the security, sensitive operation.

5. The computer implemented method of claim 1, further comprising:
    detecting, by the one or more computing devices, malicious data in the result string based on the taint data corresponding to the first string and the taint data corresponding to the operation.

6. The computer implemented method of claim 1, wherein the taint data corresponding to the first string comprises a source for tainted characters of the first string.

7. The computer implemented method of claim 1, wherein performing the operation on the first string and the second string to create the result string comprises:
    inserting the second string into the first string to create the result string, and
    wherein encoding the operation and the taint data corresponding to the operation into the delta layer of the metadata comprises:
    encoding a reference to the taint data corresponding to the second string into the delta layer of the metadata as the taint data corresponding to the operation.

8. A system, comprising:
    a memory configured to store operations; and
    one or more processors configured to perform the operations, the operations comprising:
    storing a first string in a data structure, wherein the first string includes taint data, wherein the data structure includes the first string and metadata, and the metadata includes a base layer and one or more delta layers, and wherein the base layer includes at least a taint range indicating a starting position of the first string and an ending position of the first string for the taint range, and wherein the taint range represents the taint data corresponding to the first string;
    performing an operation on the first string and a second string to create a result string, wherein the result string is stored in place of the first string in the data structure, and
    encoding the operation and taint data corresponding to the operation into a delta layer of the one or more delta layers of the metadata of the data structure, wherein the delta layer includes taint information tracking taint data corresponding to the second string.

9. The system of claim 8, wherein the taint data corresponding to the first string comprises tainted characters of the first string indicated by the taint range.

10. The system of claim 8, the operations further comprising:
    determining that the result string is needed in a security sensitive operation; and
    resolving, responsive to the determining that the result string is needed in the security sensitive operation, the taint data corresponding to the first string and the taint data corresponding to the operation into taint data corresponding to the result string.

11. The system of claim 10, wherein resolving the taint data corresponding to the result string is deferred until the result string is needed in the security sensitive operation.

12. The system of claim 8, the operations further comprising:
    detecting malicious data in the result string based on the taint data corresponding to the first string and the taint data corresponding to the operation.

13. The system of claim 8, wherein the taint data corresponding to the first string comprises a source for tainted characters of the first string.

14. The system of claim 8,
    wherein performing the operation on the first string and the second string to create the result string comprises:
    inserting the second string into the first string to create the result string, and
    wherein encoding the operation and the taint data corresponding to the operation into the delta layer of the metadata comprises:
    encoding a reference to the taint data corresponding to the second string into the delta layer of the metadata as the taint data corresponding to the operation.

15. A computer readable storage device having instructions stored thereon, execution of which, by one or more processing devices, causes the one or more processing devices to perform operations comprising:

storing a first string in a data structure, wherein the first string includes taint data, wherein the data structure includes the first string and metadata, and the metadata includes a base layer and one or more delta layers, and wherein the base layer includes at least a taint range indicating a starting position of the first string and an ending position of the first string for the taint range, and wherein the taint range represents the taint data corresponding to the first string;

performing an operation on the first string and a second string to create a result string, wherein the result string is stored in place of the first string in the data structure; and encoding the operation and taint data corresponding to the operation into a delta layer of the one or more delta layers of the metadata of the data structure, wherein the delta layer includes taint information tracking taint data corresponding to the second string.

16. The computer readable storage device of claim 15, wherein the taint data corresponding to the first string comprises tainted characters of the first string indicated by the taint range.

17. The computer readable storage device of claim 15, the operations further comprising:

determining that the result string is needed in a security sensitive operation; and resolving, responsive to the determining that the result string is needed in the security sensitive operation, the taint data corresponding to the first string and the taint data corresponding to the operation into taint data corresponding to the result string.

18. The computer readable storage device of claim 17, wherein resolving the taint data corresponding to the result string is deferred until the result string is needed in the security sensitive operation.

19. The computer readable storage device of claim 15, the operations further comprising:

detecting malicious data in the result string based on the taint data corresponding to the first string and the taint data corresponding to the operation.

20. The computer readable storage device of claim 15, wherein performing the operation on the first string and the second string to create the result string comprises:

inserting the second string into the first string to create the result string, and wherein encoding the operation and the taint data corresponding to the operation into the delta layer of the metadata comprises:

encoding a reference to the taint data corresponding to the second string into the delta layer of the metadata as the taint data corresponding to the operation.

\* \* \* \* \*